March 10, 1925.  
G. CAPPELLETTI  
FINAL DRIER  
Filed April 23, 1923  2 Sheets-Sheet 1
1,529,118
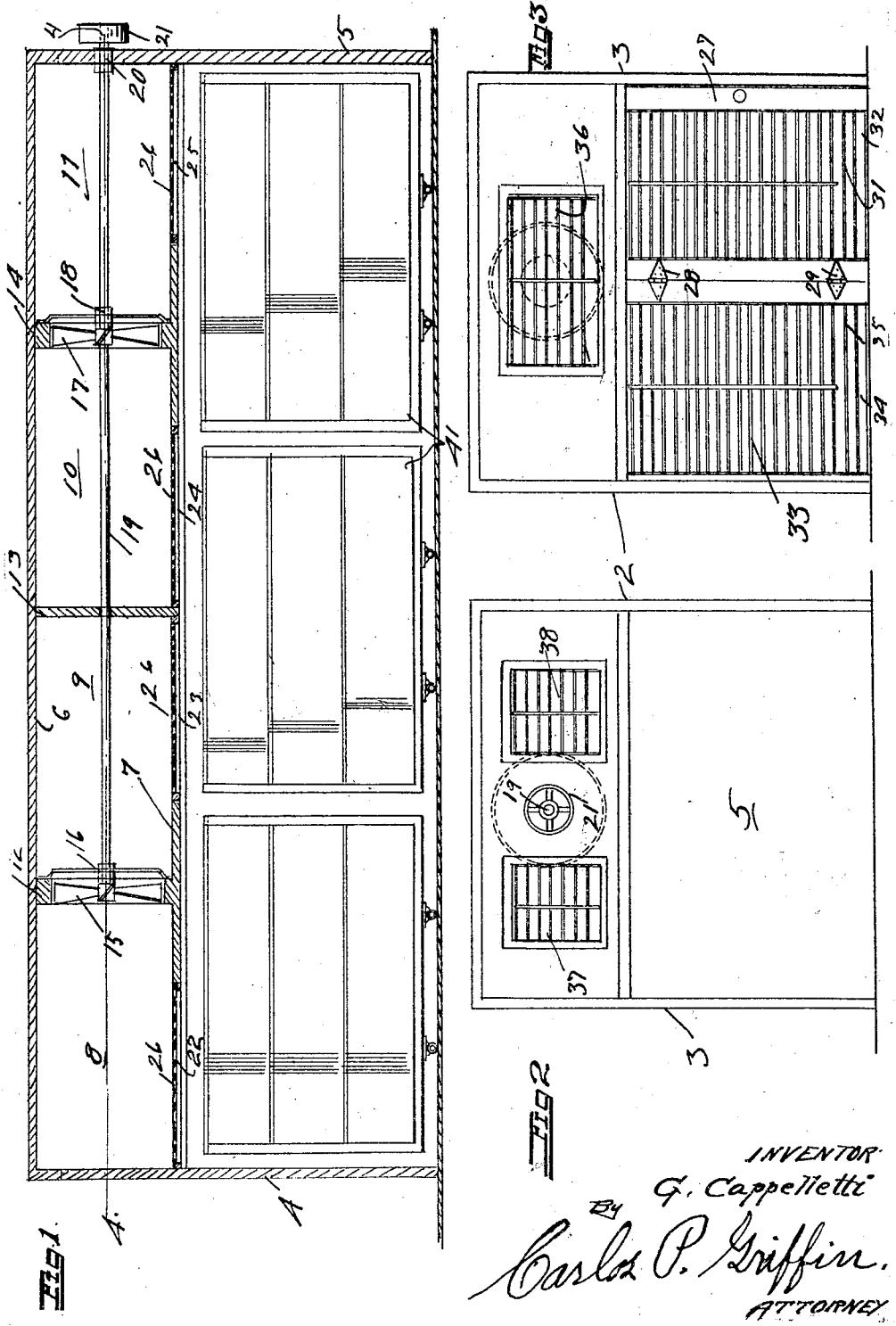

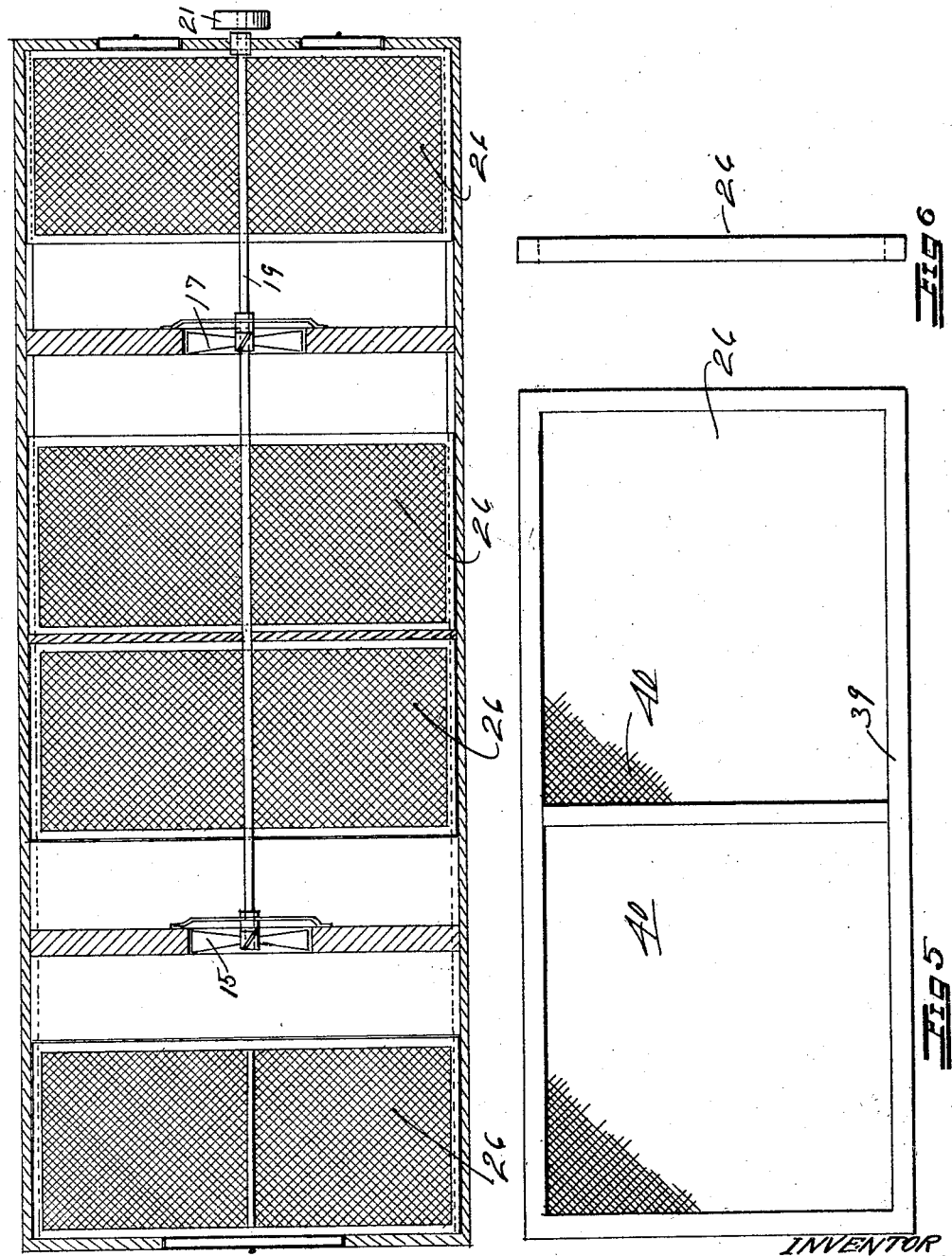

Patented Mar. 10, 1925.

1,529,118

UNITED STATES PATENT OFFICE.

GIOVANNI CAPPELLETTI, OF SAN FRANCISCO, CALIFORNIA, ASSIGNOR TO MILAN CARPENTER SHOP, A COPARTNERSHIP CONSISTING OF GIOVANNI CAPPELLETTI, GIUSEPPE BAGNANI, AND DANIELE CAPPELLETTI, ALL OF SAN FRANCISCO, CALIFORNIA.

FINAL DRIER.

Application filed April 23, 1923. Serial No. 633,844.

*To all whom it may concern:*

Be it known that I, GIOVANNI CAPPELLETTI, a citizen of the United States, residing at San Francisco, in the county of San Francisco, State of California, have invented a new and useful Final Drier, of which the following is a specification in such full and clear terms as will enable those skilled in the art to construct and use the same.

This invention relates to drier for long macaroni and the like and is more particularly adapted for the final drying process after the macaroni has had a preliminary drying in another drier.

The object of this invention is to provide a drier that will have a steady current of air thoroughly diffused through the macaroni but with not too strong a blast of air. A much longer period is required for the final drying than in the preliminary process.

Another object is to provide a drier that can be readily loaded or unloaded.

Another object is to provide a drier that is not expensive to construct and maintain.

While this machine is especially adapted to dry macaroni it is evident that it may be used to dry a considerable number of other products such as vegetables, meat and other products containing an excess of moisture.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a longitudinal vertical section of the drier.

Fig. 2 is an end view looking from the right of Fig. 1.

Fig. 3 is an end view looking from the left of Fig. 1.

Fig. 4 is a horizontal section on line 4—4 of Fig. 1.

Fig. 5 is a plan view of one of the removable screens and Fig. 6 is an end view of one of the removable screens.

The housing consists of a floor 1, side walls 2 and 3, end walls 4 and 5, a cover 6, a spaced floor 7, forming an upper chamber which is divided into four compartments 8 to 11 inclusive by the partitions 12, 13, 14.

A blower 15 is mounted in an opening in the partition 12 by suitable bearing bracket 16 and a blower 17 is mounted in an opening in the partition 14 by suitable bearing bracket 18.

The shaft 19 extends from the outside of the housing through both blowers and has a bearing 20 and a pulley 21, which is preferably driven by a reversible motor.

Openings 22 to 25 inclusive are fitted with removable screen frames 26.

A door 27 with hinges 28—29 is provided to admit a truck on which macaroni is hung in racks, the door is provided with adjustable slats 30, with two permanently open slats 31 and 32 near the bottom.

Adjustable slats 33 are provided also with two permanently open slats 34 and 35 near the bottom.

An opening into the upper chamber is covered by adjustable slats 36, and on the opposite end, two openings are covered by slats 37 and 38.

The removable screen 26 consists of a frame 39 on which is fastened a screen 40 of suitable mesh.

The trucks 41 are of usual construction and consist of a frame mounted on castors whereby the truck may be pushed in any direction.

On the frame are racks for holding poles on which the macaroni is hung. The arrangement allows for good circulation of air throughout the macaroni.

What I claim is as follows, but modifications may be made in carrying out the invention shown in the drawings and in the above particularly described form thereof, within the purview of the invention.

In a drier of the class described, an enclosing housing provided with an upper and a lower chamber, screens at different places along the partition between the upper and lower chamber, fans in the upper chamber to cause a circulation of air through said upper chamber and through the screens into the lower chamber and ventilators at the end of both the upper and lower chambers to allow a certain proportion of the air being circulated to escape from the upper chamber, and a door for the lower chamber to allow loaded trucks to be moved into the lower chamber.

In testimony whereof I have hereunto set my hand this 30th day of March, A. D. 1923.

GIOVANNI CAPPELLETTI.